Nov. 5, 1957

C. F. WOLTERS 2,812,226

FILING CABINETS

Filed Sept. 29, 1955

INVENTOR.
CARL F. WOLTERS
BY Clyde A. Norton.
Robert I. Hulsizer
ATTORNEYS.

Nov. 5, 1957 C. F. WOLTERS 2,812,226
FILING CABINETS
Filed Sept. 29, 1955 4 Sheets-Sheet 2
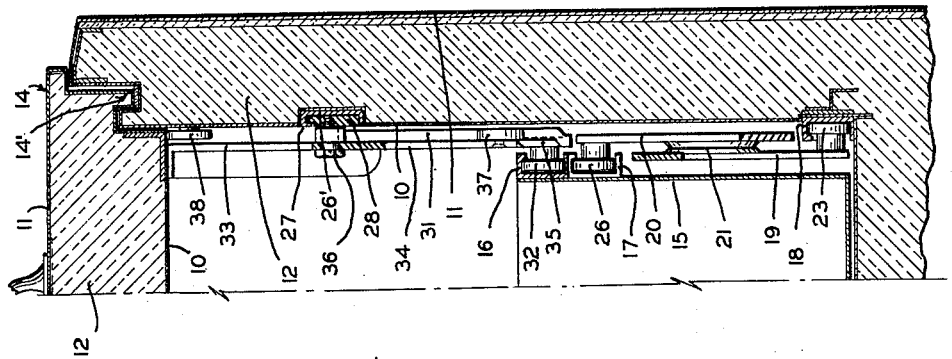
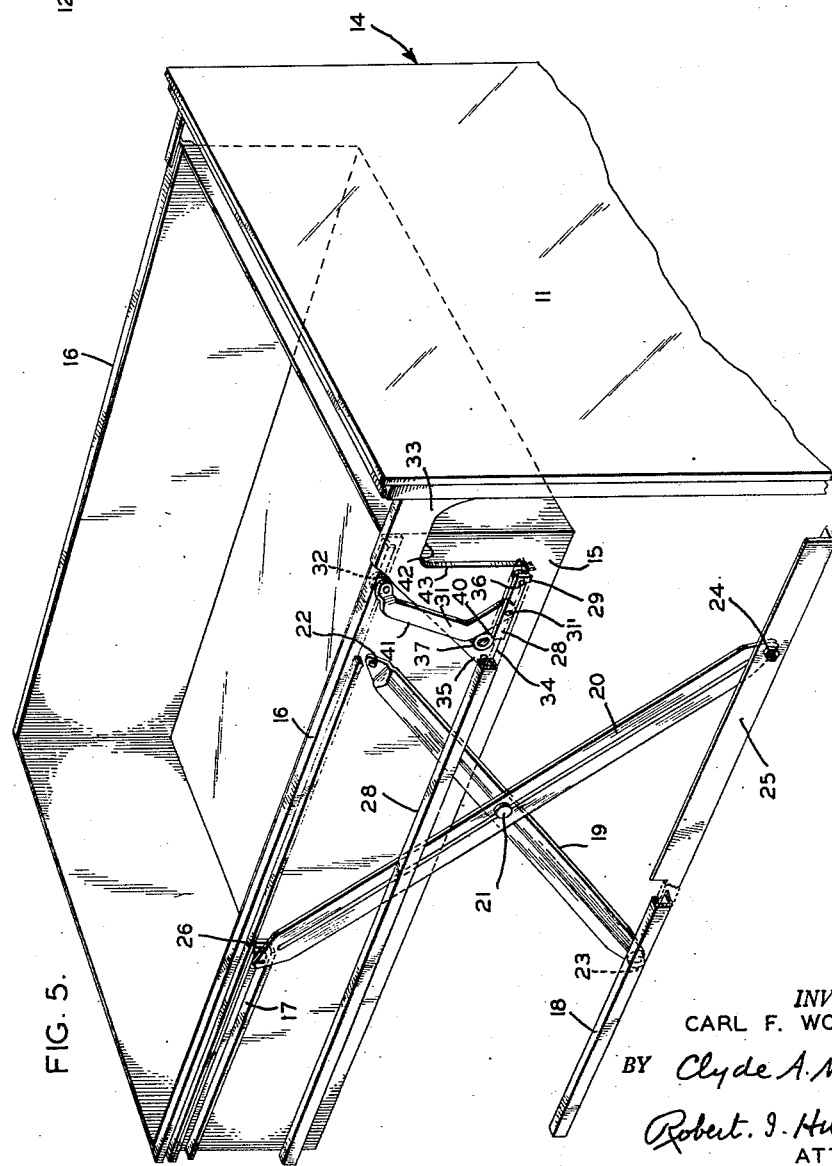
INVENTOR.
CARL F. WOLTERS
BY Clyde A. Norton.
Robert J. Hulsizer.
ATTORNEYS.

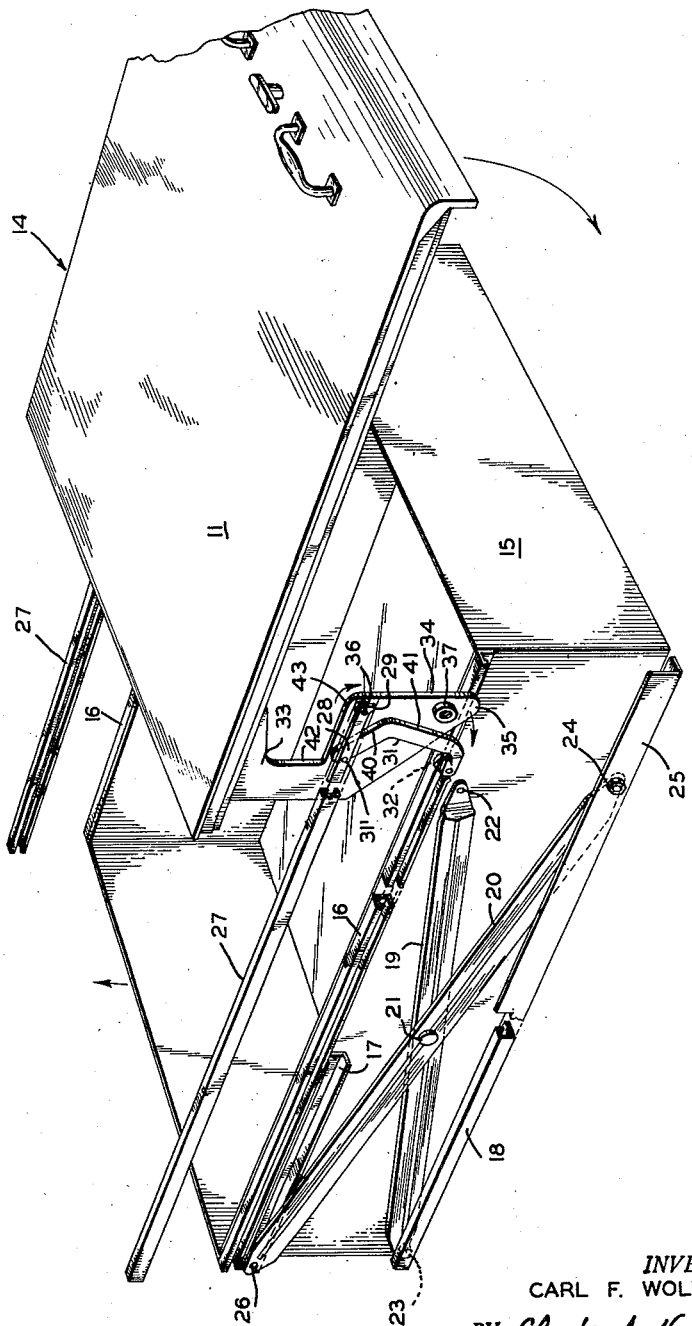

Nov. 5, 1957     C. F. WOLTERS     2,812,226
FILING CABINETS
Filed Sept. 29, 1955     4 Sheets-Sheet 4
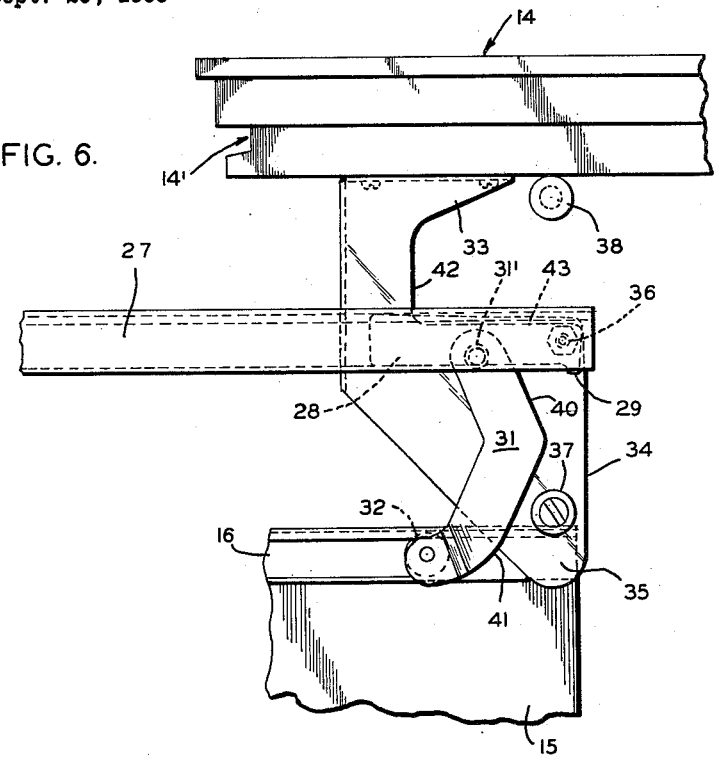
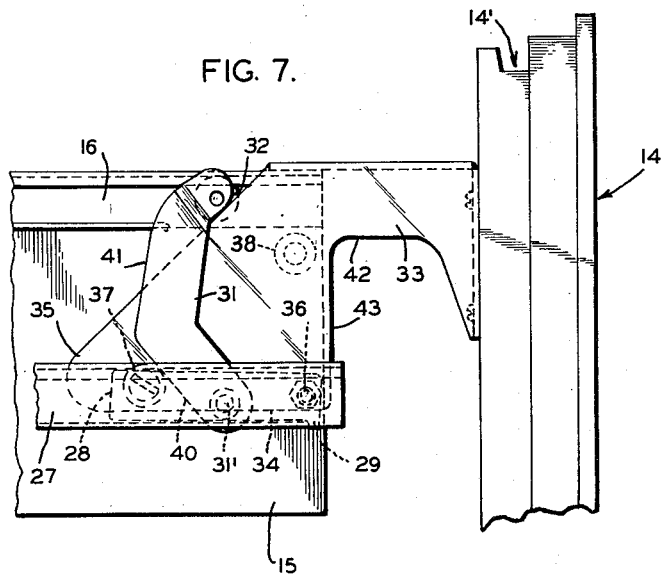
INVENTOR.
CARL F. WOLTERS
BY Clyde A. Norton.
Robert J. Hulsizer.
ATTORNEYS.

United States Patent Office 2,812,226
Patented Nov. 5, 1957

2,812,226

FILING CABINETS

Carl F. Wolters, New Canaan, Conn., assignor to Sperry Rand Corporation, New York, N. Y., a corporation of Delaware Application September 29, 1955, Serial No. 537,387

1 Claim. (Cl. 312—272.5)

This invention relates to new and useful improvements in filing cabinets and constitutes an improvement over the cabinet shown in my U. S. Patent No. 1,943,997 issued January 16, 1934, and entitled "Filing Cabinet."

An object of the invention is to provide a simplified structure which is easier to operate and in which the parts are locked in operative position by automatic means associated with the movement of the cover to open position, and unlocked automatically when the cover is moved to closed position.

A further object is to provide simple and efficient means acting automatically to latch the parts in forward position against any tendency to move rearwardly after the cover has started to swing to open position, and to lock the parts in operative position as the cover is moved to its fully open position.

A further object is to provide means whereby the weight of the cover alone activates the above mentioned locking means at predetermined periods in its opening movement and conversely will automatically release the locking means in its return movement.

In brief and general terms, the invention comprises a filing cabinet having insulated walls and a sliding top cover similarly insulated. The top and cover have interlocking tongues and grooves as shown in the above mentioned patent. The cover, through related dependent arms, is connected to slidable means such as lock plates running in channels disposed at each side of the cabinet. As the cover is moved forward to open position, its movement in this direction is limited by the abutment of the dependent arms with the inside front wall of the cabinet. During this forward movement of the cover it rides on rollers at the top inner side walls of the cabinet and these rollers are so disposed as to keep the lock plates in the channels slightly lifted so that toes on their front ends will not be lowered into notches or slots at the front end of the channels in which they slide while the cover is in a horizontal position. However, the instant the weight of the cover is taken off the rollers, its weight will force the lock plates down and engage the toes in the slots to prevent the cover from being returned to closed position.

A further feature of the invention relates to the fact the arms on the cover are pivoted to the lock plates and levers are also pivoted thereto at one end, the other ends of the levers have rollers riding in channels along the top of a tray disposed normally near the bottom of the cabinet. A lazy tongue mechanism is disposed on each side of the tray so that as it is lifted it will maintain an even level position. The dependent arms on the cover have cam means such as rollers thereon near the bottom so that when the cover is swung down to lie across the front wall of the cabinet these rollers will engage these levers to swing them around their pivot point on the lock plates and thus lift the tray. The last mentioned rollers and the levers are so related that when the tray is fully elevated the rollers are disposed to the rear of the levers to hold the parts in this position until the cover is swung back to closed position. When the cover is swung up to return to normal the cam rollers are released from the levers and the weight of the tray causes the same to be lowered. The lock plates however are not unlocked from the notch until the cover reaches the position where it is again supported on the rollers above mentioned whereupon the lock plate is lifted and the cover may be slid back to normal position.

A further feature of the invention relates to the fact that the structural relation of the operating parts is such that in any position of the cover as it swings down or upward the weight of the cover balances the weight of the tray and associated parts so that only the slightest effort is required to either lower the cover or to raise it.

Summarizing the above general description it will be apparent that a cover has dependent arms pivoted to slidable means such as lock plates which are provided with means to lock them in position when the cover is moved forward and its weight is removed from other means on the cabinet which prevents the lock plates from being engaged in locking position. Conversely when the weight is removed from the dependent arms as the cover is lifted the lock plates are unlocked and the cover may return to normal. Operating levers pivoted on the lock plate and connected to the tray are moved by engagement with rollers on the dependent arms to lift the tray when the cover is swung from its forward horizontal position downwardly across the front wall of the cabinet.

The present preferred form which the invention may assume is illustrated in the drawings of which, Fig. 1 is a perspective view of the device;

Fig. 3 is a vertical transverse section taken on the line 3—3 of Fig. 2;

Fig. 4 is a perspective view showing the cover moved forward but not in final position with the tray not elevated;

Fig. 5 is a similar view showing the cover in its final open position with the tray elevated;

Fig. 6 is an enlarged detail with the cover forward but not in final position; and Fig. 7 is a similar view showing the cover in final open position and the parts locked in this position.

Figure 1:
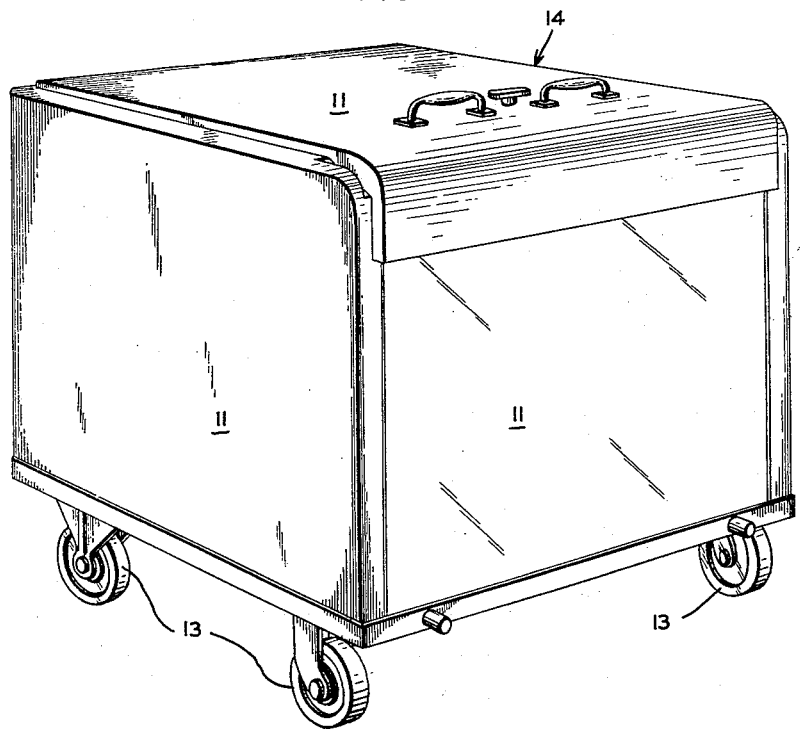

Referring now to the specific form of the invention illustrated in the drawings, the device is in the form of a box-like cabinet with all six of its walls comprising spaced sheet metal walls 10 and 11 with heat-resisting insulating material 12 disposed therebetween. This cabinet is mounted on rollers 13 for easy movement. The cover 14 is of the general form shown in the above mentioned patent, and is adapted to slide forward from the position shown in Fig. 2 to the position shown in Fig. 4 and then to be swung downward to the position shown in Fig. 5. The cover and cabinet are provided with the usual interengaging tongues and grooves indicated generally at 14'.

Figure 2:
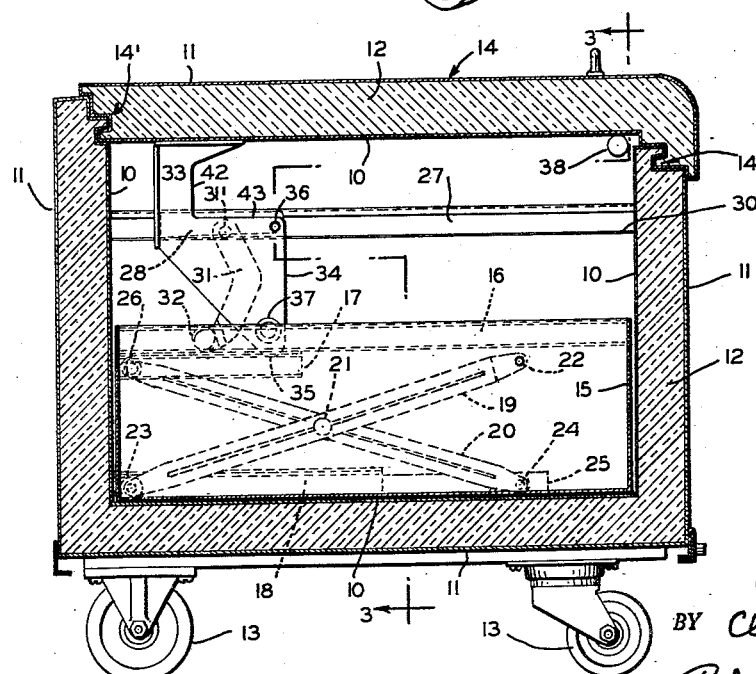
Fig. 2 is a longitudinal vertical section taken through the device and looking toward the right side thereof with the cover closed.

Within the cabinet there is disposed a shallow tray 15 which normally is disposed at the bottom of the cabinet as shown in Fig. 2 but is adapted to be lifted to the position shown in Fig. 5 where the contents thereof are readily accessible. All along the outer faces of the side walls of the tray at the top thereof are fixed channel elements 16. Along the same surface at the rear portion thereof are other channel elements 17 disposed just below the rear portions of channel elements 16. Along the inner side walls of the cabinet at the rear and bottom thereof are disposed channel elements 18 extending a short distance forwardly.

A lazy tongue mechanism on each side of the cabinet comprising two levers 19 and 20 medially pivoted together at 21 is adapted to permit the tray 15 to be lifted and lowered in a level manner. The lever 19 at its front end is pivotally connected as at 22 to the outer upperfront portion of the side of the tray 15. The other end of lever 19 is provided with a roller 23 adapted to slide in the channel element 18. The front end of lever 20 is pivotally connected as at 24 to a bar 25 disposed along the lower inner side of the cabinet. The other end of lever 20 is provided with a roller 26 which is adapted to slide in the channel element 17. Since there is such a lazy tongue mechanism on each side of the cabinet against the inner side walls thereof it will be seen that when the tray is raised or lowered it is maintained in a level position.

Disposed on the inner side walls of the cabinet near the tops thereof is a longitudinal recess 26' in which is disposed a channel element 27 in which a slideable means such as a lock plate 28 is adapted to move. This plate is slightly tapered and at its front lower edge is provided with a dependent toe 29 which is adapted to enter a slot 30 at the front bottom wall of the channel element 27 when the lock plate 28 is moved to its forward position, and to ride along the said bottom when the plate is in any other position. To this plate is pivoted at 31' one end of an angular lever 31, the other end of which supports a roller 32 which rides in the channel element 16.

The cover 14 has attached thereto at the under face thereof and at the rear sides of said face dependent arms 33 which, in the normal position thereof, as shown in Fig. 2 have vertically disposed front walls 34 and downwardly disposed noses 35. At a mid-point 36 the plates 33 are pivoted to the plate 28 and on the outside of the plates 33 near the nose 35 are cam rollers 37.

Disposed in the upper front corners of the inner side walls 10 of the cabinet are rotatably supported rollers such as 38 on which rests the bottom wall of the cover 14 when it is in a horizontal position and which facilitates the motion of the cover in moving forwardly or rearwardly. When the cover rests on the rollers 38, the cover and arms 33 are supported at such a height as to hold the front end of the lock plates 28 lifted so that their forward toes 29 cannot enter the slots 30 in the bottom of the channel elements 27, but when the cover 14 is not resting on the rollers 38 the toes may enter the slots when the cover is moved to its forward position and then swung downwardly to the position shown in Fig. 7.

It will be noted that the angular levers 31 have front edges 40 and 41 obliquely related to form cam surfaces to be engaged by the cam rollers 37 as will be set forth hereinafter. It will be also noted that the dependent arms 33 have upper front vertical edges 42 and horizontal edges 43 which extend from the edges 42 forward to the pivot points 36. The distances from the pivot points 36 to the edges 42 are slightly greater than from the pivot points 36 to the top of the front wall of the cabinet as can be seen from Fig. 2 so that when the cover is swung out and downwardly the edges 42 will lie above the top of the front wall of the cabinet, and the cover will then not rest on the rollers 38. It will also be noted that when the cover 14 is moved forward as far as it will go in a horizontal position, the lower front edges 34 of the arms 33 will abut the rear surface 10 of the front wall of the cabinet and prevent further forward motion of the arms 33 and associated parts.

Considering the operation of the device, starting with the parts in their normal retracted position with the cover 14, as shown in Fig. 2, in order to lift the tray 15 to have access to the files or ledgers thereon, the cover is moved forward riding on the rollers 38 and with its side grooves sliding in similar grooves in the side walls of the cabinet as shown in the above mentioned patent. The cover is pulled forward to the position shown in Fig. 4 at which time the forward edges 34 abuts the inner front wall of the cabinet. During this forward movement the lock plates 28 ride in the channels 27, and the rollers 32 ride in the channels 16, and with the toes 29 sliding along the bottom of the channels 27. When the lock plates 28 reach the position shown in Fig. 6 the toes 29 will not drop into the slots 30 in the channels 27 because the cover is still resting on the rollers 38 the height of which prevents the front end of the lock plates 28 from dropping enough to allow the toes to enter the notches. However as soon as the cover starts to swing from the position of Fig. 6 to that of Fig. 7, it will pivot the arms 33 around the pivot points 36 and the cover will be lifted clear of the rollers 38 and the weight of the cover, through the arms 33 will press down on the lock plates 28 and force the toes into the slots 30 in the channel elements 27 thus preventing the plates 28 from sliding rearwardly while the cover is being tilted to its full open position.

As the cover 14 thus starts to swing to full open position, the cam rollers 37 on the arms 33 will be pressed against the angular edges 41 of the levers 31 which, through the rollers 32 riding in the channels 16 will lift the tray 15 to the position shown in Fig. 7 at which time the rollers 37 will have ridden around the edges of the levers 31 and will then be pressing forwardly against the edges 40 of the levers 31. The weight of the cover creates this pressure which will hold the parts in this position and the tray elevated until the cover is lifted to restore it to its normal closed position. A consideration of the length of levers 31 in Fig. 2 will show that when it is swung around by the tilting and full opening of the cover the tray is lifted so that the top of it along the line of the channel 16 will be slightly above the top edges of the cabinet walls. During this movement from closed to fully open position of the cover 14 the lazy tongue levers 19 and 20 as above described will cause the tray to remain level in either its upward or downward movement.

Now when the cover is lifted from the fully opened position shown in Fig. 7 to start closing it, the arms 33 start to swing counterclockwise thus withdrawing the rollers 37 from in back of the levers 31. When the rollers are thus retracted from the surfaces of the levers, the weight of the tray 15 will force the levers 31 to swing from the position shown in Fig. 7 to the position shown in Fig. 6, in which the tray is restored to its lowermost position and the cover is disposed in the horizontal position shown in Fig. 6. As the cover is moved to this position it bears on the rollers 38 which lifts the cover slightly and thus lifts and locks plates 28 slightly and lifts the toes 29 out of the slots 30 and thus permits the cover 14 to be slid back to closed position.

It will thus be seen that I have provided a simple, relatively economical, and efficient mechanism which can be easily operated with a minimum of effort. While I have described what I consider to be a highly desirable embodiment of my invention, it is obvious that many changes in form could be made without departing from the invention, and I, therefore, do not limit myself to the exact form herein shown and described, nor to anything less than the whole of my invention as hereinbefore set forth, and as hereinafter claimed.

What I claim as my invention, is:

In a device of the class described, a cabinet with walls and cover interlocked for sliding movement by tongues and grooves, supporting rollers near the top of the side walls at the front thereof, dependent arms at the sides to the rear of the cover with front edges abutting the inner front wall of the cabinet when the cover is in its foremost position, the cover resting on said rollers when in its foremost position, said cover being lifted from said rollers as it starts to be swung down, the side walls of the cabinet having channels therein, slideable lock plates in said channels, said plates tapered with locking toes at their front ends, notches at the bottom of the front ends of the channels to receive said toes, said dependent arms pivoted to said slideable plates, a tray in the cabinet, levers pivoted at one end to said slideable plates, rollers on the other ends of said levers, said tray having channels to receive said lever rollers, cam rollers on the arms to engage the levers to lift the tray when the arms are moved around their pivot points, said cam rollers on said arms adapted to lie back of said levers when the tray is lifted and to lock them in lifted position, and lazy tongue levers between the cabinet and tray on each side of the tray to assure a level lift of the tray.

References Cited in the file of this patent

UNITED STATES PATENTS

| | | |
|---|---|---|
| 1,943,997 | Wolters | Jan. 16, 1934 |
| 2,201,948 | Watkins | May 21, 1940 |